United States Patent [19]
Berkema et al.

[11] Patent Number: 5,699,515
[45] Date of Patent: Dec. 16, 1997

[54] BACKOFF SCHEME FOR ACCESS COLLISION ON A LOCAL AREA NETWORK

[75] Inventors: Alan Berkema, Sacramento; Scott C. Petler, Rocklin, both of Calif.

[73] Assignee: Hewlett-Packard Company, Palo Alto, Calif.

[21] Appl. No.: 376,492

[22] Filed: Jan. 23, 1995

[51] Int. Cl.$^6$ .................................. G06F 13/14; H04J 3/02
[52] U.S. Cl. .................................. 395/200.06; 340/825.5; 370/447; 370/448
[58] Field of Search ........................ 340/825.5, 447, 340/448; 395/200.02, 200.06

[56] References Cited

U.S. PATENT DOCUMENTS

| | | | |
|---|---|---|---|
| 4,063,220 | 12/1977 | Metcalfe et al. | 340/825.5 |
| 4,234,952 | 11/1980 | Gable et al. | 370/448 |
| 4,412,326 | 10/1983 | Limb | 370/448 |
| 4,598,285 | 7/1986 | Hoshen | 340/825.5 |
| 5,319,641 | 6/1994 | Fridich et al. | 370/447 |
| 5,353,287 | 10/1994 | Kuddes et al. | 370/448 |
| 5,436,903 | 7/1995 | Yang et al. | 370/448 |

OTHER PUBLICATIONS

Ramakrishnan and Yang, "The Ethernet Capture Effect: Analysis and Solution", Local Computer Networks, 1994 19th Conference, pp. 228–240, Mar. 1994.

Gumbold et al., "Temporary Overload in High Speed Backbone Networks", INFOCOM '92, pp. 10B.3.1–10B.3.10 (2280–2289), Jun. 1992.

Lee et al., "Performance Evaluation of an Integrated Bridged Token Ring/Ethernet Environment", Computers and Communications, 1991 Int'l. Phoenix Conference, pp. 637–643, May 1991.

Sohraby and Austin, "ISDN Primary Rate Interface Impact on Performance of Integrated Voice and Data on CSMA/CD Networks—A Measurement and Simulation Study", GLOBECOM '90: IEEE Global Telecommunications Conference, pp. 506.7.1–506.7.8 (0912–0919), Apr. 1990.

Chua and Lye, "Backoff Considerations in CSMA/CD LAN with Single Time–Varying Channel", Electronics Letters, V.27, No.9, pp. 747–748, Apr. 1991.

Gursharan S. Sidhu, Richard F. Andrews, and Alan B. Oppenheimer, *Inside Apple Talk*, Second Edition, Addison-Wesley Publishing Company, Inc., Reading Massachusetts, 1990, Appendix B, pp. B–3,4,8–14.

The Local Area Network (LAN) standard, ISO/IEC 8802-3: 1990, [ANSI/IEEEE Std 802.3 1990 Edition], Part 3, pp. 50,51 and 66 through 68.

*Primary Examiner*—Tod R. Swann
*Assistant Examiner*—Christopher Chow

[57] ABSTRACT

Transmission of a first message over a local area network is delayed by a delay value. The delay value is calculated based on a backoff value in a backoff counter and a generated random number. Transmission of the first message is deferred when another node on the local area network begins transmission of another message while transmission of the first message is being delayed for the delay value. The backoff value in the backoff counter is incremented when the transmission of the first message is deferred. The backoff value in the backoff counter is incremented when transmission of the first message collides with transmission of another message by another node on the local area network. The backoff value in the backoff counter is decremented when the first message is transmitted without being deferred and without colliding with transmission of another message.

20 Claims, 4 Drawing Sheets

BACKOFF SCHEME FOR ACCESS COLLISION ON A LOCAL AREA NETWORK

BACKGROUND

The present invention relates generally to local area networks and particularly to a backoff scheme used to avoid continuous access collision between nodes attempting to simultaneously access a network.

A local area network is used to facilitate communication between nodes which are located in relatively close proximity. The nodes include, for example, personal computers and printers.

One protocol used for communicating over a local area network protocol is the LocalTalk Link Level Access Protocol (LLAP). For general information on LLAP, see Gursharan S. Sidhu, Richard F. Andrews, and Alan B. Oppenheimer, *Inside Apple Talk*, Second Edition, Addison-Wesley Publishing Company, Inc., Reading Mass., 1990.

Nodes on an LLAP network are connected together on a shared transmission medium or link. Each node on the link may communicate with every other node on the link. LLAP regulates access to the link using Carrier Sense Multiple Access with Collision Avoidance (CSMA/CA). When a node wants to transmit, the node listens to determine if the link is idle or in use. If the node detects the link is in use, the node will defer to the transmission already in progress. If the link is idle, the node waits a specified amount of time before the node attempts to transmit. When the node does transmit there is a possibility that the transmission will collide with a transmission from another node.

When a node detects a collision, the node backs off for a random amount of time before re-attempting a transmission. The node backs off for a random amount of time in order to increase the possibility that one of the competing nodes will transmit successfully. If the nodes did not back off for a random amount of time, it is possible each node would repeatedly back off the same amount of time and repeatedly collide when re-transmission is attempted.

Collisions and deferrals are an indication that the link is busy. As the link gets busier and more collisions and deferrals are detected, it is desirable to increase the range of backoff times to increase the possibility that one node will succeed in transmitting without a collision. A node generally uses what is known about the number of deferrals and collisions that it has encountered to chose a larger or smaller range of backoff values which will be randomly selected.

Within the LLAP a complicated backoff scheme is generally utilized. This backoff scheme utilizes a number of counters and a complicated bit shifting algorithm to count the number of bits set in a byte. While acceptable for software, this such a backoff scheme is expensive to implement in hardware.

SUMMARY OF THE INVENTION

In accordance with the preferred embodiment of the present invention, transmission of a first message over a local area network is delayed by a delay value. The delay value is calculated based on a backoff value in a backoff counter and a generated random number. For example, the generated random number is generated using a free running system clock. Also, in the preferred embodiment, the backoff value is a number between 0 and 15, and the delay value is calculated so that a probability of each delay value being calculated based on the backoff value and the generated random number is as in the following table:

| Backoff Value | Delay Value | Probability of Occurrence |
|---|---|---|
| 0–3 | 0 microseconds | 50% |
| 0–3 | 100 microseconds | 50% |
| 4–7 | 0 microseconds | 25% |
| 4–7 | 100 microseconds | 50% |
| 4–7 | 200 microseconds | 25% |
| 8–11 | 100 microseconds | 25% |
| 8–11 | 200 microseconds | 25% |
| 8–11 | 300 microseconds | 25% |
| 8–11 | 400 microseconds | 25% |
| 11–15 | 100 microseconds | 25% |
| 11–15 | 400 microseconds | 25% |
| 11–15 | 600 microseconds | 25% |
| 11–15 | 800 microseconds | 25% |

Transmission of the first message is deferred when another node on the local area network begins transmission of another message while transmission of the first message is being delayed for the delay value. The backoff value in the backoff counter is incremented when the transmission of the first message is deferred. The backoff value in the backoff counter is incremented when transmission of the first message collides with transmission of another message by another node on the local area network. The backoff value in the backoff counter is decremented when the first message is transmitted without being deferred and without colliding with transmission of another message.

In the preferred embodiment of the present invention, when transmission of the first message is deferred, a deferral value in a deferral counter is incremented. When the deferral value equals a predetermined maximum value, transmission of the first message is abandoned.

When transmission of the first message collides with transmission of another message by another node on the local area network, a collision value in a collision counter is incremented. When the collision value equals a predetermined maximum value, transmission of the first message is abandoned.

The present invention provides for a simplified backoff scheme which may be efficiently implemented in hardware.

DESCRIPTION OF THE PREFERRED EMBODIMENT

Figure 1:
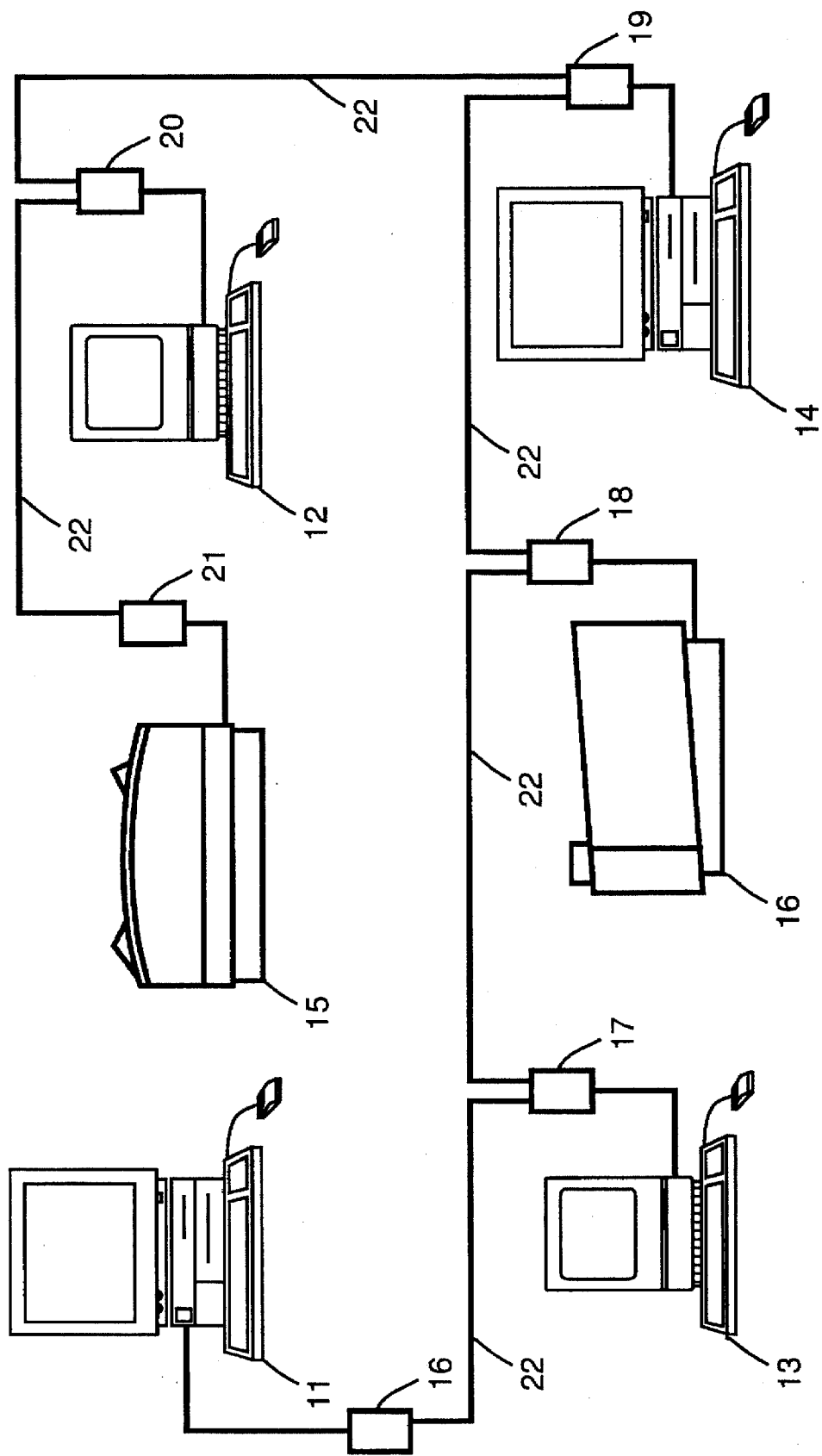
FIG. 1 shows several personal computers and printers connected in a local area network.

FIG. 1 shows a personal computer 11, a personal computer 12, a personal computer 13, a personal computer 14, a printer 15 and a printer 16, each of which function as a node connected in a local area network. A connector 16, a connector 17, a connector 18, a connector 19, a connector 20 and a connector 21, and connection medium 22 are used to provide physical connection between the nodes of the local area network. For example, the local area network operates in accordance with the LocalTalk Link Level Access Protocol (LLAP).

Figure 2:
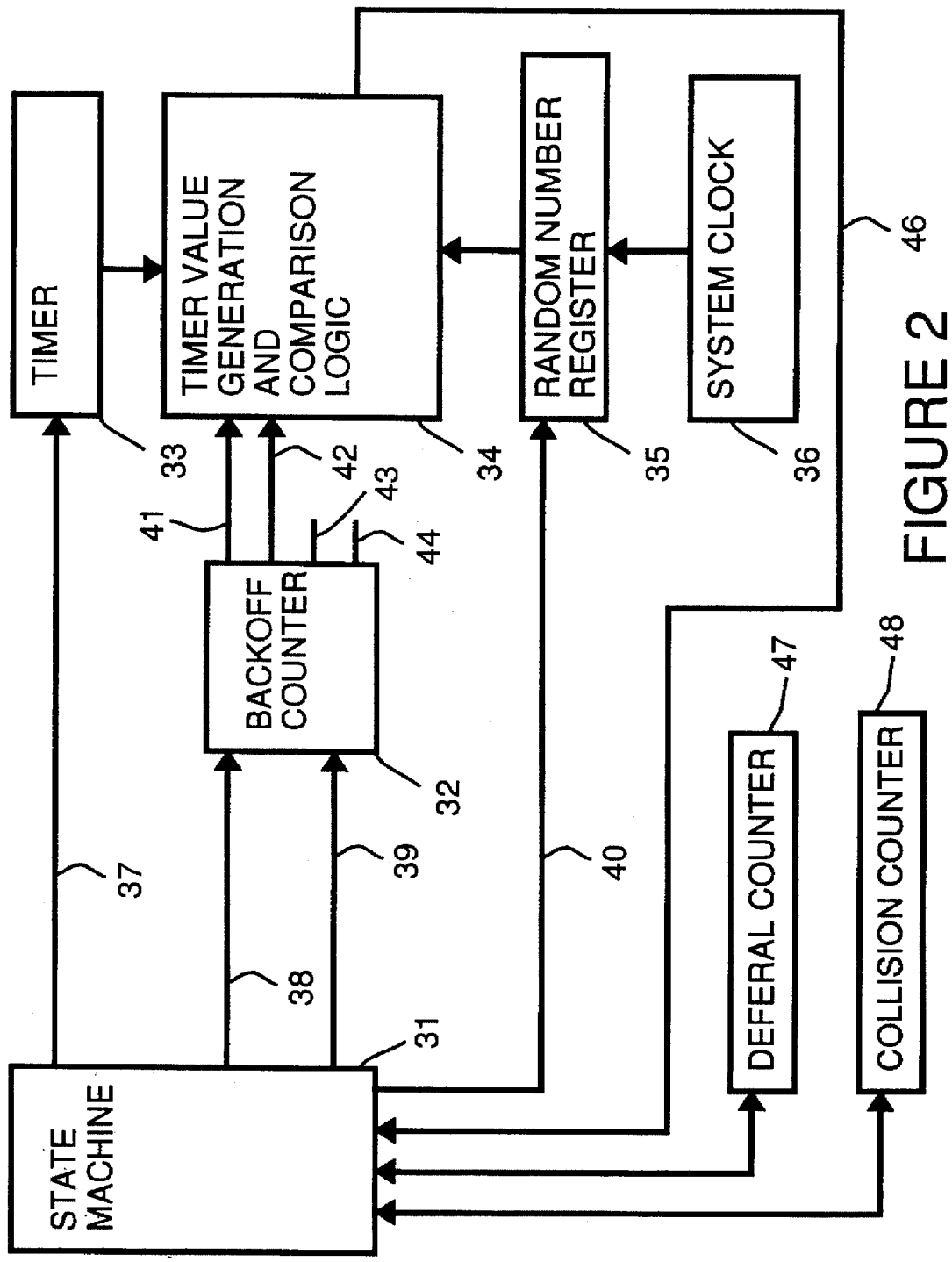
FIG. 2 shows a block diagram of hardware used to implement a backoff scheme in accordance with the preferred embodiment of the present invention.

FIG. 2 shows a hardware design which implements a backoff scheme in accordance with a preferred embodiment of the present invention. The hardware includes a state machine 31, a backoff counter 32, a timer 33, a timer value generator and comparator logic block 34, a random number register 35, a system clock 36, a deferral counter 47 and a collision counter 48.

State machine 31 clears timer 33 through a clear timer line 37. State machine 31 signals backoff counter 32 to increment the value in backoff counter 32 using increment line 38. State machine 31 signals backoff counter 32 to decrement the value in backoff counter 32 using decrement line 38. State machine 31 signals, through a signal line 40, random number register 35 to load a two-bit random value based on system clock 36. System clock 36 is independent of other nodes on the network. System clock 36 is not derived from a common source such as the AC power main. System clock 36 is derived from a local independent source such as a crystal based oscillator. In the preferred embodiment the two-bit random value is set equal to the current value of the two low order bits of system clock 36. System clock 36 is free running.

Backoff counter 32 is a four bit counter. Backoff counter 32 is not a continuous counter. That is when backoff counter 32 holds its maximum value and then is incremented, backoff counter 32 continues to hold the maximum value. Likewise, when backoff counter 32 holds its minimum value and then is decremented, backoff counter 32 continues to hold the minimum value. As will be explained further below, timer value generator and comparator logic block 34 uses the two high order bits of the value stored in backoff counter 32, as illustrated by outputs 41 and 42, and the value in random number register 35 to generate a backoff timer value. The low order bits of the value stored in backoff counter 32, as illustrated by outputs 43 and 44, are not used to generate the backoff timer value. When the timer value in timer 33 is equal to the backoff timer value generated by timer value generator and comparator logic block 34, timer value generator and comparator logic block 34 signals state machine 31 through a signal line 46. Timer 33, after being cleared to zero, counts from zero to fifteen at a predetermined pace.

Figure 3:
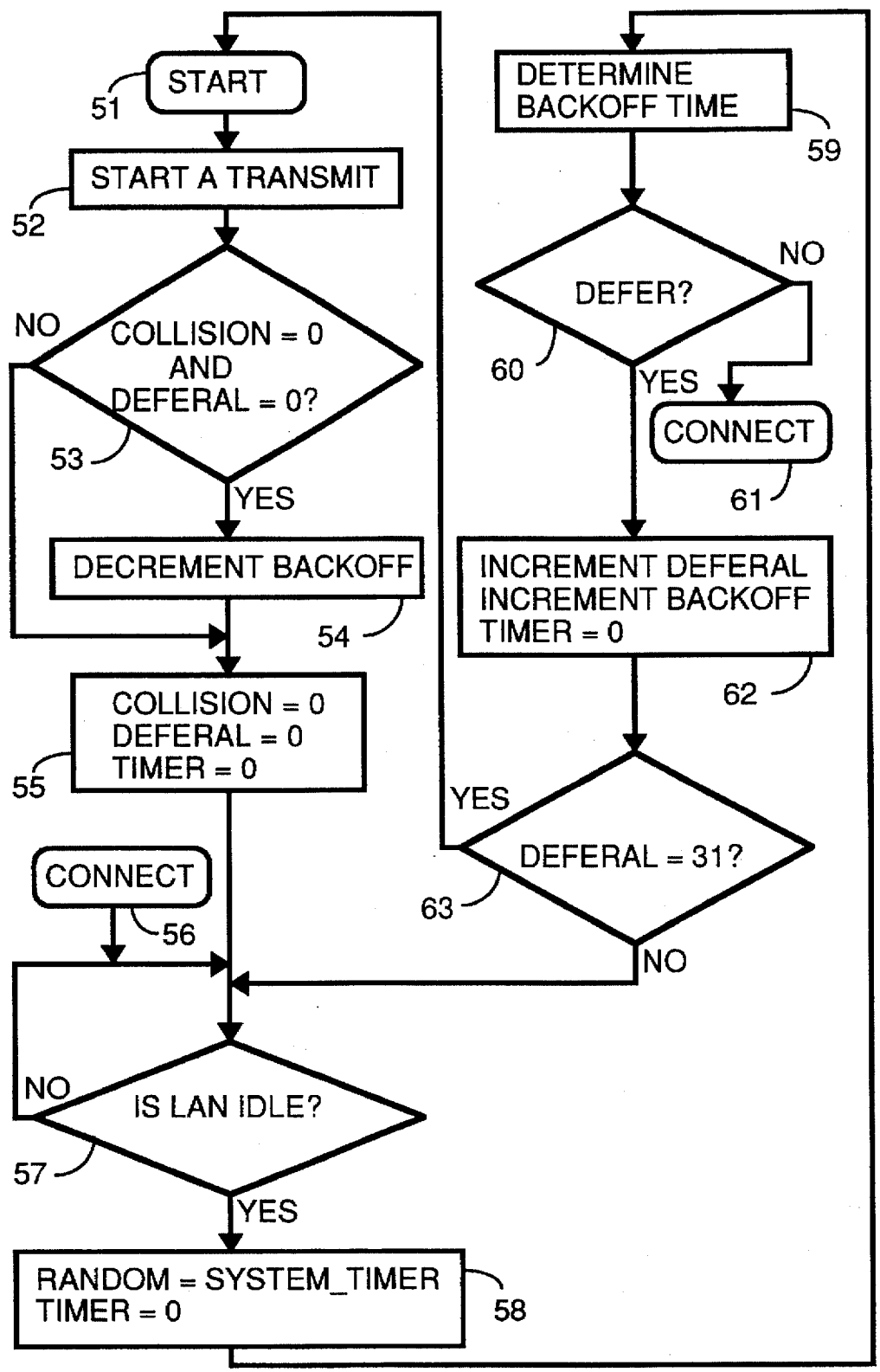
FIG. 3 and FIG. 4 show a flowchart which describes operation of a backoff scheme in accordance with the preferred embodiment of the present invention.
Figure 4:
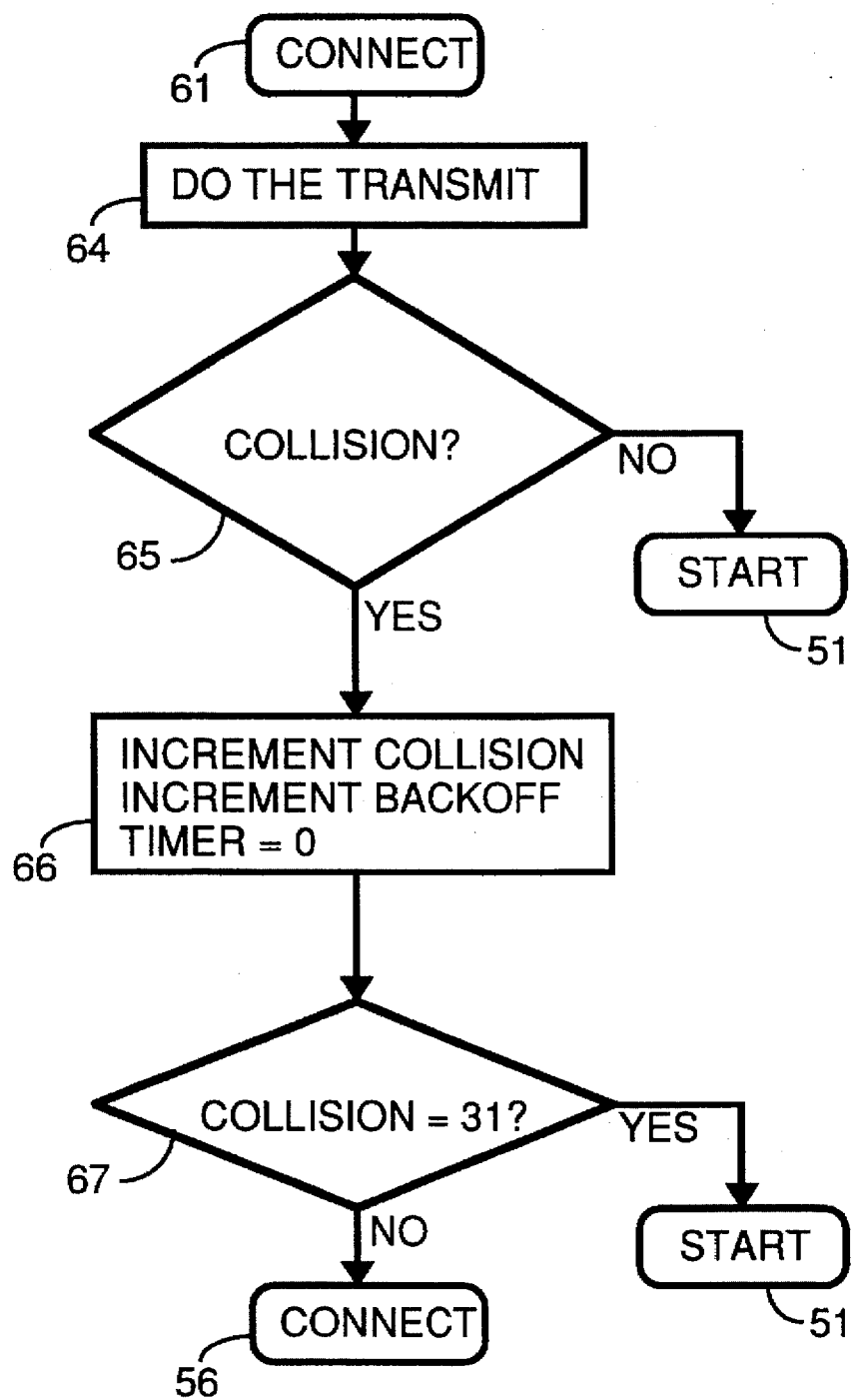

FIG. 3 and FIG. 4 show a flowchart which describes operation of a backoff scheme in accordance with the preferred embodiment of the present invention. The scheme uses the hardware shown in FIG. 2. The flow chart shows when the various counters shown in FIG. 2 are incremented decremented or cleared. In general, whenever the value (COLLISION) in collision counter 48, or the value (DEFERRAL) in deferral counter 47 is incremented, the value (BACKOFF) in backoff counter 32 is incremented.

The value (RANDOM) in random number register 35 is used in order to provide a random element in the backoff scheme. The random element is necessary to avoid the case where two or more nodes repeatedly back off the same amount of time and repeatedly collide when re-transmission is attempted.

A step 51, shown in FIG. 3 is the entry point for the backoff scheme when a new message is to be transmitted over the local area network. In a step 52, a frame transmission is begun. In a step 53, a check is made of collision counter 48 and deferral counter 47. If both are at zero, in a step 54, state machine 31 decrements backoff counter 42. The value in backoff counter 42 is retained across transmission messages. The value in backoff counter 42 indicates the load on the network. A low value indicates that the network, in the recent past, has been lightly loaded. A high value in backoff counter 42 indicates that the network has had sufficient traffic to result in a number of collisions and/or deferrals. In the preferred embodiment, backoff counter 42 always contains a positive integer from 0 to 15, and is not decremented lower than 0.

In a step 55 collision counter 48 and deferral counter 47 are set to zero. In addition, state machine 31, through clear line 37, clears timer 33 to zero.

In a step 57, the state machine 31 waits for the local area network to become idle. As long as there is a transmission from another node currently in progress, state machine 31 stays in step 57.

In a step 58, the two low order bits of the free running system clock are placed in random number register 35. In addition, timer 33 is cleared to zero. In the preferred embodiment of the present invention, timer 33 is cleared to zero at this locations to take into account a wait for a period of time specified by the CSMA/CA protocol. Clearing timer 33 to zero is not required for the specific backoff scheme discussed herein.

In a step 59, the state machine 31 delays proceeding with transmission until timer value generator and comparator logic block 34 signals that the value in timer 33 equals the backoff timer value. The backoff timer value is determined by the current value in backoff counter 42 and the value loaded into random number register 35. In the preferred embodiment, the backoff timer value is calculated in accordance with Table 1 below:

TABLE 1

| Value in Backoff Counter | Value in Random Counter | Backoff Timer Value | Probability of Occurrence |
| --- | --- | --- | --- |
| 0–3 | 0,1 | 0 microseconds | 50% |
| 0–3 | 1,2 | 100 microseconds | 50% |
| 4–7 | 0 | 0 microseconds | 25% |
| 4–7 | 1,2 | 100 microseconds | 50% |
| 4–7 | 3 | 200 microseconds | 25% |
| 8–11 | 0 | 100 microseconds | 25% |
| 8–11 | 1 | 200 microseconds | 25% |
| 8–11 | 2 | 300 microseconds | 25% |
| 8–11 | 3 | 400 microseconds | 25% |
| 11–15 | 0 | 100 microseconds | 25% |
| 11–15 | 1 | 400 microseconds | 25% |
| 11–15 | 2 | 600 microseconds | 25% |
| 11–15 | 3 | 800 microseconds | 25% |

In Table 1, the first column shows the current value in backoff counter 42 and the second column shows the current value in random number register 35. The third column shows the backoff timer value assigned for the various combinations of values in backoff counter 42 and in random number register 35. The fourth column shows the probability of occurrence of each backoff timer value for each value in backoff counter 42.

In a step 60, a determination is made as to whether the carrier of another transmission was detected during the wait, in step 59, for timer 33 to equal the backoff timer value. If so, in a step 62, deferral counter 47 and backoff counter 42 are both incremented. The value for the time is set to zero. In the preferred embodiment, backoff counter 42 is not incremented past the value fifteen.

In a step 63, if the deferral counter has a value less than 31, the state machine 31 returns to step 57 and the transmission is tried again. If, in step 63, deferral counter 47 has a value equal to 31, state machine 31 abandons the transmission and returns to step 51 to start a new transmission.

If in step 60, no carrier of another transmission was detected during the wait, in step 59, for timer 33 to count to the backoff timer value, in a step 64, shown in FIG. 4, the node proceeds with attempting the transmission. The connection between step 60 in FIG. 3 and step 64 in FIG. 4 is illustrated by a connect block 61.

In a step 65, a determination is made as to whether the carrier of another transmission was detected during the attempted transmission in step 64. If so, in a step 66, collision counter 48 and backoff counter 42 are both incremented. In addition, the value in timer 33 is cleared to zero.

In a step 67, if collision counter 48 has a value less than 31, the node returns to step 57 and the transmission is tried again. The connection between step 67 in FIG. 4 and step 57 in FIG. 3 is illustrated by a connect block 56. If in step 67, collision counter 48 has a value equal to 31, the current transmission is abandoned and state machine 31 returns to step 51 to start a new transmission.

If in step 65, no carrier of another transmission was detected during the attempted transmission, the transmission is considered complete, and state machine 31 returns to step 51 to wait for or process a new transmission.

Table 2 below sets out Verilog code for implementing timer value generator and comparator logic block 34 in accordance with the preferred embodiment of the present invention. In Table 2, the character "?" represents a mask or a "don't care" bit, as will be understood by persons of ordinary skill in the art.

TABLE 2

```
module tmrcomp(timer,random,backoff,timeout,ifg,idg,randbk,resp,
       tstmode, tsttout,tstifg,ifgmore);
input[15:0] timer;
input[1:0] random,backoff;
input tstmode,tsttout,tstifg;
output timeout,ifg,idg,randbk,resp,ifgmore;
   // individual bit toggle rates for timer input
/*     15    70
       14    35
       13    17
       12    8.8mS
       11    4.4
       10    2.2
        9    1.1mS
        8    555uS
        7    277uS
        6    138uS
        5    69
        4    34
        3    17
        2    8.6uS
        1    4.3uS
        0    2.17uS */
  // timeout  = 37500 uS = 37.5mS =    ??1?  ??1?  ????  ????
  // ifg      = 200uS =               ????  ????  ??1?  111?
  // ifgmore  = 600uS =               ????  ????  1??1  ????
  // idg      = 400uS =               ????  ????  ?1?1  11?1
  // randbk   = random & local back off X 100 us (use bit 4,5,6,7)
  // response = 160 uS =              ????  ????  ??1?  ?1?1
  wire timeout  = (timer[14] & timer[10]) | tsttout;
  wire ifg      = (timer[6] & timer[4] & timer[3] & timer[2]) | tstifg;
  wire ifgmore  = (timer[8] & timer[5]) | tstifg;
  wire idg      = (timer[7] & timer[5] & timer[4] & timer[3] &
                   timer[1]) | tstmode;
/* BACKOFF ALGORITHM */
/* clsns/deferrals  backoff cntr   backoff amount (%)
   0-3         00xx          0uS (100)
   4-7         01xx          0uS(25%) 100uS(50%) 200uS(25%)
   8-11        10xx          100uS(25%) 200uS(25%) 300uS(25%)
   400uS(25%)
   12-15       11xx          100uS(25%) 400uS(25%) 600uS(25%)
   800uS(25X)
                 8     7     6     5    4    3    2    1    0
                555   277   138   69   34   17  8.6  4.3  2.17
   100uS         0     0     0    1    0    1    1    1    0
```

TABLE 2-continued

```
   200uS   0   0   1   0   1   1   1   0   0
   300uS   0   1   0   0   1   0   1   0
   400uS   0   1   0   1   1   1   0   0   0
   600uS   1   0   0   0   1   0   1   0   0
   800uS   1   0   1   1   1   0   0   0   1
*/
wire slot1 = (timer[5] & (timer[3:1] == 3'b111));  // 100uS
wire slot2 = (timer[6] & (timer[4:2] == 3'b111));  // 200uS
wire slot3 = (timer[7] & timer[3] & timer[1]);     // 300uS
wire slot4 = (timer[7] & (timer[5:3] == 3'b111));  // 400uS
wire slot6 = (timer[8] & timer[4] & timer[2]);     // 600uS
wire slot8 = (timer[8] & (timer[6:4] == 3'b111) & timer[0]); // 800uS
reg randbk;
     always @(backoff or random or slot1 or slot2 or slot3 or slot4 or
         slot6 or slot8 or tstmode)
     casex ({tstmode,backoff,random})
     5'b1????:randbk = 1;
     5'b000??:randbk = 1;
     5'b0?100:randbk = slot1;
     5'b01?00:randbk = slot1;
     5'b00101:randbk = 1;
     5'b00110:randbk = slot1;
     5'b00111:randbk = slot2;
     5'b01?11:randbk = slot4;
     5'b01001:randbk = slot2;
     5'b01010:randbk = slot3;
     5'b01101:randbk = slot8;
     5'b01110:randbk = slot6;
     endcase
wire resp = (timer[6] & timer[3] & timer[1]) | tstmode;
endmodule
```

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for transmitting a first message over a local area network comprising the steps of:

(a) delaying transmission of the first message by a delay value;

(b) calculating the delay value based on a backoff value in a backoff counter and a generated random number;

(c) deferring transmission of the first message when another node on the local area network begins transmission of another message while transmission of the first message was being delayed in step (a);

(d) incrementing the backoff value in the backoff counter when the transmission of the first message is deferred in step (c);

(e) beginning transmission of the first message;

(f) incrementing the backoff value in the backoff counter when transmission of the first message collides with transmission of another message by another node on the local area network; and, (g) decrementing the backoff value in the backoff counter when the first message is transmitted without being deferred and without colliding with transmission of another message.

2. A method as in 1 wherein in step (b) the backoff value is a number between 0 and 15, and the delay value is calculated so that a probability of each delay value being calculated based on the backoff value and the generated random number is as in the following table:

| Backoff Value | Delay Value | Probability of Occurrence |
|---|---|---|
| 0–3 | 0 microseconds | 50% |
| 0–3 | 100 microseconds | 50% |
| 4–7 | 0 microseconds | 25% |
| 4–7 | 100 microseconds | 50% |
| 4–7 | 200 microseconds | 25% |
| 8–11 | 100 microseconds | 25% |
| 8–11 | 200 microseconds | 25% |
| 8–11 | 300 microseconds | 25% |
| 8–11 | 400 microseconds | 25% |
| 11–15 | 100 microseconds | 25% |
| 11–15 | 400 microseconds | 25% |
| 11–15 | 600 microseconds | 25% |
| 11–15 | 800 microseconds | 25% |

3. A method as in claim 1 wherein step (c) includes the following substeps when transmission of the first message is deferred:

(c.1) incrementing a deferral value in a deferral counter;

(c.2) when the deferral value equals a predetermined maximum value, abandoning transmission of the first message;

(c.3) if transmission of the first message is not abandoned in substep (c.2) repeating steps (a), (b) and (c).

4. A method as in claim 3 additionally comprising the following step:

(h) when transmission of the first message collides with transmission of another message by another node on the local area network performing the following substeps:

(h.1) incrementing a collision value in a collision counter;

(h.2) when the collision value equals a predetermined maximum value, abandoning transmission of the first message; and, (h.3) if transmission of the first message is not abandoned in substep (h.2) repeating steps (a), (b), (c), (d), (e), (f), (g) and (h).

5. A method as in claim 1 additionally comprising the following step:

(h) when transmission of the first message collides with transmission of another message by another node on the local area network performing the following substeps:

(h.1) incrementing a collision value in a collision counter;

(h.2) when the collision value equals a predetermined maximum value, abandoning transmission of the first message; and, (h.3) if transmission of the first message is not abandoned in substep (h.2) repeating steps (a), (b), (c), (d), (e), (f), (g) and (h).

6. A method as in claim 1 wherein in step (b) the generated random number is generated using a free running system clock.

7. A method as in claim 1, wherein in step (b) the delay value is calculated so that when the backoff value increases in value, a range of potential values of the delay value increases.

8. A device for determining a delay value by which to delay transmission of a first message over a local area network, the device comprising:

a random number generator which generates a random number;

a timer;

a backoff counter which contains a backoff value;

delay value calculating means, coupled to the timer, the random number generator and the backoff count, for calculating a delay value based on the backoff value and the generated random number; and, control means coupled to the backoff counter, the timer, the random number generator and the delay value calculating means, for causing the backoff counter to increment the backoff value when transmission of the first message is deferred or when transmission of the first collides with transmission of another message.

9. A device as in claim 8 wherein the backoff value in the backoff counter is a number between 0 and 15, and the delay value calculating means calculates the delay value so that a probability of each delay value being calculated based on the backoff value and the generated random number is as in the following table:

| Backoff Value | Delay Value | Probability of Occurrence |
|---|---|---|
| 0–3 | 0 microseconds | 50% |
| 0–3 | 100 microseconds | 50% |
| 4–7 | 0 microseconds | 25% |
| 4–7 | 100 microseconds | 50% |
| 4–7 | 200 microseconds | 25% |
| 8–11 | 100 microseconds | 25% |
| 8–11 | 200 microseconds | 25% |
| 8–11 | 300 microseconds | 25% |
| 8–11 | 400 microseconds | 25% |
| 11–15 | 100 microseconds | 25% |
| 11–15 | 400 microseconds | 25% |
| 11–15 | 600 microseconds | 25% |
| 11–15 | 800 microseconds | 25% |

10. A device as in claim 8 additionally comprising a deferral counter coupled to the control means, the deferral counter containing a deferral value which is incremented when transmission of the first message is deferred.

11. A device as in claim 8 additionally comprising a collision counter coupled to the control means, the collision counter containing a collision value, the collision counter incrementing the collision value when transmission of the first message collides with transmission of another message.

12. A device as in claim 8 wherein the random number generator generates the random number using a free running system clock.

13. A device as in claim 8, wherein the delay value calculating means calculates the delay value so that when the backoff value increases in value, a range of potential values of the delay value increases.

14. A method for determining a delay value by which to delay transmission of a first message over a local area network, the method comprising the steps of:

(a) calculating the delay value based on a backoff value in a backoff counter and a generated random number;

(b) incrementing the backoff value in the backoff counter when the transmission of the first message is deferred;

(c) incrementing the backoff value in the backoff counter when transmission of the first message collides with transmission of another message by another node on the local area network; and, (d) decrementing the backoff value in the backoff counter when the first message is transmitted without being deferred and without colliding with transmission of another message.

15. A method as in 14 wherein in step (a) the backoff value is a number between 0 and 15, and the delay value is calculated so that a probability of each delay value being calculated based on the backoff value and the generated random number is as in the following table:

| Backoff Value | Delay Value | Probability of Occurrence |
|---|---|---|
| 0–3 | 0 microseconds | 50% |
| 0–3 | 100 microseconds | 50% |
| 4–7 | 0 microseconds | 25% |
| 4–7 | 100 microseconds | 50% |
| 4–7 | 200 microseconds | 25% |
| 8–11 | 100 microseconds | 25% |
| 8–11 | 200 microseconds | 25% |
| 8–11 | 300 microseconds | 25% |
| 8–11 | 400 microseconds | 25% |
| 11–15 | 100 microseconds | 25% |
| 11–15 | 400 microseconds | 25% |
| 11–15 | 600 microseconds | 25% |
| 11–15 | 800 microseconds | 25% |

16. A method as in claim 14 wherein step (b) includes the following substeps when transmission of the first message is deferred:
   (b.1) incrementing a deferral value in a deferral counter;
   (b.2) when the deferral value equals a predetermined maximum value, abandoning transmission of the first message;
   (b.3) if transmission of the first message is not abandoned in substep (c.2) repeating steps (a) and (b).

17. A method as in claim 16 additionally comprising the following step:
   (e) when transmission of the first message collides with transmission of another message by another node on the local area network performing the following substeps:
      (e.1) incrementing a collision value in a collision counter;
      (e.2) when the collision value equals a predetermined maximum value, abandoning transmission of the first message; and,
      (e.3) if transmission of the first message is not abandoned in substep (e.2) repeating steps (a), (b), (c), (d) and (e).

18. A method as in claim 14 additionally comprising the following step:
   (e) when transmission of the first message collides with transmission of another message by another node on the local area network performing the following substeps:
      (e.1) incrementing a collision value in a collision counter;
      (e.2) when the collision value equals a predetermined maximum value, abandoning transmission of the first message; and,
      (e.3) if transmission of the first message is not abandoned in substep (e.2) repeating steps (a), (b), (c), (d) and (e).

19. A method as in claim 14 wherein in step (1) the generated random number is generated using a free running system clock.

20. A method as in claim 14, wherein in step (a) the delay value is calculated so that when the backoff value increases in value, a range of potential values of the delay value increases.

* * * * *